Aug. 24, 1926.
A. O. H. PETERSEN
1,597,478
SPRAYING DEVICE FOR VAPORIZING PLANTS
Filed May 21, 1925
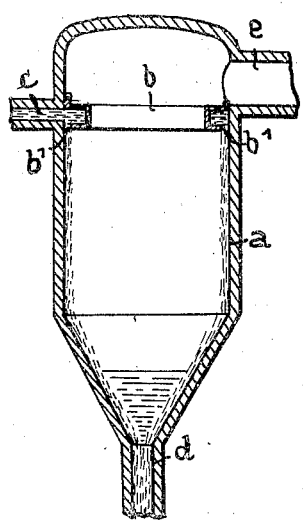
INVENTOR:
Alfred O. H. Petersen
By Richards & Geier
Attys.

Patented Aug. 24, 1926.

1,597,478

UNITED STATES PATENT OFFICE.

ALFRED OTTO HERMANN PETERSEN, OF ALTONA/ELBE, GERMANY, ASSIGNOR TO N. V. NEDERLANDSCHE INSTALLATIE MAATSCHAPPIJ THERMA, OF AMSTERDAM, NETHERLANDS.

SPRAYING DEVICE FOR VAPORIZING PLANTS.

Application filed May 21, 1925, Serial No. 31,860, and in Germany November 5, 1923.

A spraying device by means of which the walls of the heated tubes of evaporators are continually moistened by means of a liquid are known per se. In these known evaporating plants the liquid to be evaporated was partly introduced from the top and evaporated by flowing down the heated tubes in a thin stream and partly introduced into the evaporator from the bottom, passed upwardly through the heated tubes and then again passed downwardly through other heated tubes. When dealing with liquids with which a continuous separation of salts takes place the salt which is separated will readily be deposited on the walls of the heated tubes. This also occurs in the case of evaporators which are formed as boilers, as in the present case and, therefore, without heated tubes, if the liquid is supplied through a simple pipe connection. The salt deposited on the walls is therefore lost, and in addition produces lengthy and tedious work in removal.

This disadvantage is adapted to be remedied by the present invention by supplying the liquid to the evaporator through an annular spraying device and continually moistening the walls of the evaporator in such a manner as to prevent the salts which are separated from being deposited on the walls.

An example of construction of the subject of the invention is illustrated in the accompanying drawing. In the upper part of the evaporator $a$ is provided a hollow ring $b$ combining with the interior wall of the evaporator to form a receptacle which is provided with an annular slot $b'$. In the ring $b$ terminates the supply pipe $c$. Above the ring is provided an outflow pipe $e$ whilst to the lower funnel shaped part of the evaporator $a$ is connected the discharge pipe $d$.

The salt solution is introduced into the hollow ring $b$ through the pipe $c$, flows through the slot $b'$ and runs down the walls of the evaporator $a$. The vapours which are generated are conducted away by the pipe $e$ whilst the salts which are separated are carried away with the solution through the pipe $d$.

Having thus described my invention, what I claim as new and desire to secure by Letters Patent is:—

A spraying device for evaporating apparatus including, in combination, a tank having an outflow connection at its upper end and a discharge opening at the lower end thereof, a hollow ring extending around the interior of said tank adjacent said outflow connection and combining with the wall of said tank to form a receptacle, one side of said ring forming the bottom of the receptacle and being provided with an annular slot contiguous to said wall whereby a solution in said receptacle will flow through said slot and downwardly over the interior surface of said wall through said discharge opening, and a supply pipe extending through the wall of said tank and directly into said receptacle.

In witness whereof I hereunto subscribe my name this 29th day of April A. D. 1925.

ALFRED OTTO HERMANN PETERSEN.